UNITED STATES PATENT OFFICE.

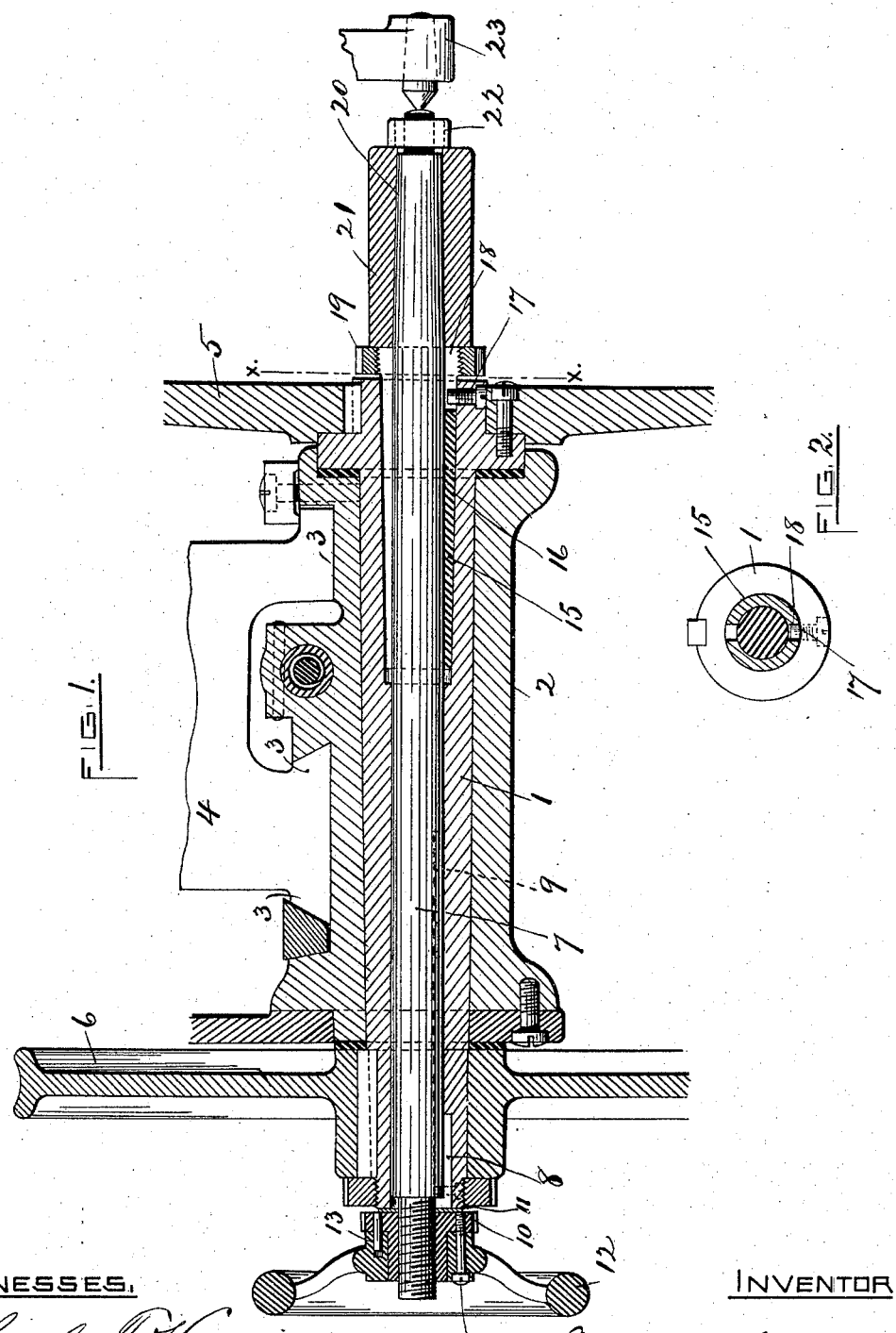

ZECHARIAH R. TUCKER, OF PROVIDENCE, RHODE ISLAND, ASSIGNOR TO THE BROWN & SHARPE MANUFACTURING COMPANY, OF SAME PLACE.

SUPPORTING-ARBOR.

SPECIFICATION forming part of Letters Patent No. 586,210, dated July 13, 1897.

Application filed April 13, 1896. Serial No. 587,312. (No model.)

*To all whom it may concern:*

Be it known that I, ZECHARIAH R. TUCKER, of Providence, county of Providence, State of Rhode Island, have invented certain new and useful Improvements in Supporting-Arbors; and I do hereby declare the following specification, taken in connection with the accompanying drawings, forming a part of the same, to be a full, clear, and exact description thereof.

The present invention relates to a supporting-arbor for use in gear-cutting, milling, or other machines in which the work is supported on an arbor and acted on by cutters or other tools.

In the class of machines above referred to it has been the common practice to insert and remove the work by sliding it longitudinally on and off the end of the arbor. This manner of inserting and removing the work is objectionable in many instances—as, for instance, when an outboard-bearing is used for supporting the end of the arbor, it being necessary in such case to move said outboard-bearing out of the way before the work could be inserted or removed. Again, the removal of the work from the arbor longitudinally thereof may be rendered difficult or objectionable by reason of the position of the cutter or some other obstruction in the machine, in which case the cutter or obstruction has to be moved out of the way or the arbor-support moved so that the work may pass the obstruction, thus destroying the previous and desired adjustment and requiring such adjustment to be restored after the insertion of each piece of work.

It is the object of the present invention to overcome these difficulties by providing an arbor which may be clamped firmly to the arbor-support to rigidly support the work and which is also capable of longitudinal movement in said arbor-support, whereby said arbor may be withdrawn from and inserted into the work by a longitudinal movement thereof, and the work may thus be placed in position to receive the arbor and also be removed from the machine by moving said work at right angles to the arbor and without altering the relative positions of the arbor-support and the other parts of the machine.

As before stated, an arbor embodying the present invention may be used in any of the machines in which supporting-arbors are commonly used, and in the drawings, forming part of this application, one embodiment of the invention is shown in connection with the spindle-head of a gear-cutting machine, and this form of the invention will now be described.

Referring to the drawings, Figure 1 is a longitudinal sectional view through the spindle-head of a gear-cutting machine; and Fig. 2 is a transverse section on line $xx$, Fig. 1.

In the form shown the spindle 1 forms the arbor-support and is mounted in the usual manner in the spindle-head 2, which is supported on the ways 3, formed on the frame 4 in a common and well-known manner. The spindle is provided at its forward end with the face-plate 5 and at its rear end with the worm-gear 6, connected in the usual manner with the indexing mechanism. (Not shown.) An arbor 7 is mounted in the spindle 1 and is connected therewith by means of the key 8, which is secured to the spindle and enters a groove 9 in the arbor, so that the arbor cannot turn in said spindle, but is capable of longitudinal movement therein. The arbor is turned down at its rear end and provided with a screw-thread on which is mounted a screw-threaded nut 10, which is adapted to engage a washer 11, interposed between the end of the spindle 1 and said nut. A hand-wheel 12 is secured to the nut 10 by means of the pin 13 and the screw 14 and serves as a means for adjusting the nut on the arbor and for withdrawing the arbor from the work. Any suitable means may be used to clamp the arbor to the arbor-support, but it is preferred to use a split sleeve surrounding the arbor and engaging the spindle by means of one or more inclined surfaces, whereby longitudinal movement of the sleeve will contract the sleeve and firmly clamp the arbor to the spindle. The preferred form of said sleeve and the manner of mounting it in the spindle are shown in the drawings, in which a tapered split sleeve 15 surrounds the arbor and fits within a tapered bore 16 in the front end of the spindle, being prevented from turning therein by the screw 17, which enters a slot 18 in said sleeve. The sleeve 15 is screw-threaded at its forward end and carries a nut 19, which may be forced against the end of the spindle to withdraw the sleeve 15 and thus unclamp the arbor. Any suitable means may be employed to secure the work to the arbor, but it is preferred to use the means shown, which consists of a taper 20 on the end of the arbor and a split sleeve or bushing 21, which is expanded to clamp the work by being forced up said taper, preferably by means of the nut 22. The ordinary outboard-bearing for supporting the front end of the arbor is shown at 23.

The mode of operation is as follows: To insert the work, the arbor is drawn back within the spindle until its end is flush with the end of the sleeve 15, the nut 22 and bushing 21 of course being removed and the arbor unclamped. The bushing 21 is placed within the work, which is then placed in position with the bore of said bushing in line with the arbor. The arbor is then thrust forward through said bushing and the nut 22 screwed against the end of said bushing, forcing it onto the taper 20 and thus clamping the work to the arbor. The nut 19 is moved away from the end of the spindle and the hand-wheel turned to draw the arbor rearward, thus bringing the end of the bushing 21 against the end of the tapered sleeve 15 and forcing said sleeve into the bore of the spindle and clamping the arbor to the spindle.

To remove the work, the nut 22 is removed and the nut 19 forced against the end of the bushing 21, thus forcing said bushing off the taper 20 and unclamping the work. The nut 19 is then forced against the end of the spindle, thus drawing the sleeve out of the bore of the spindle and releasing the arbor, which is then withdrawn from the bushing, leaving the work free to be removed at right angles to the arbor and without changing the relative positions of the arbor-support and other parts of the machine.

What I claim as my invention, and desire to secure by Letters Patent, is—

1. The combination with an arbor-support, of an arbor constructed to be withdrawn within said support, and means for clamping said arbor in said support, substantially as described.

2. The combination with an arbor-support, of an arbor passing through the support and constructed to be withdrawn within the same, and means for clamping said arbor to said support, substantially as described.

3. The combination with an arbor-support, of a split sleeve mounted therein and engaging therewith by one or more inclined surfaces, an arbor passing through said support, and said split sleeve, substantially as described.

4. The combination with an arbor-support provided with a tapered bore, of a split sleeve fitting said bore, an arbor passing through said support and said sleeve, and a nut threaded on the end of said sleeve, substantially as described.

5. The combination with an arbor-support, of a split sleeve mounted therein and engaging therewith by one or more inclined surfaces, an arbor passing through said support and said split sleeve, and a nut on the rear end of said arbor, substantially as described.

6. The combination with an arbor-support, of a split sleeve mounted therein and engaging therewith by one or more inclined surfaces, an arbor passing through said sleeve, a taper on the front end of said arbor, and a nut on the end of said sleeve, substantially as described.

7. The combination with an arbor-support, of an arbor extending through said support, means for moving said arbor longitudinally in said support and means for securing the work upon the end of said arbor, substantially as described.

8. The combination with an arbor-support provided with a tapered bore, of a split sleeve fitting said bore, an arbor passing through said support and sleeve, a nut threaded on the rear end of said arbor, a taper at the front end of said arbor, a split bushing on said taper, and a nut threaded on the end of said sleeve between said support and said bushing, substantially as described.

ZECHARIAH R. TUCKER.

Witnesses:
W. H. THURSTON,
IRA L. FISH.